United States Patent
Ahmadvand et al.

(10) Patent No.: US 8,923,180 B2
(45) Date of Patent: Dec. 30, 2014

(54) POWER SAVING IN WIRELESS NETWORK ENTITIES

(71) Applicant: MOSAID Technologies Incorporated, Ottawa (CA)

(72) Inventors: Nima Ahmadvand, Ottawa (CA); Xuejun Lu, Ottawa (CA); Hanwu Hu, Ottawa (CA); Mouhamadou Lamine Sylla, Ottawa (CA)

(73) Assignee: Conversant Intellectual Property Management Incorporated, Ottawa, Ontario (CA)

( * ) Notice: Subject to any disclaimer, the term of this patent is extended or adjusted under 35 U.S.C. 154(b) by 156 days.

(21) Appl. No.: 13/747,802

(22) Filed: Jan. 23, 2013

(65) Prior Publication Data

US 2014/0204814 A1    Jul. 24, 2014

(51) Int. Cl.
*H04W 52/02* (2009.01)
*H04W 36/00* (2009.01)

(52) U.S. Cl.
CPC .......... *H04W 52/0206* (2013.01); *H04W 52/02* (2013.01); *H04W 36/0055* (2013.01)
USPC ............................. 370/311; 370/328; 370/331

(58) Field of Classification Search
CPC ............ H04W 52/02; H04W 52/0206; H04W 36/0055; H04W 74/04; H04W 28/26; H04W 8/18; H04W 84/12; H04L 12/12; H04L 12/18
USPC .................................................. 370/311–478
See application file for complete search history.

(56) References Cited

U.S. PATENT DOCUMENTS

| | | | | |
|---|---|---|---|---|
| 7,436,790 | B2* | 10/2008 | Todd et al. ................... | 370/311 |
| 7,610,053 | B2* | 10/2009 | Funato et al. ................. | 455/458 |
| 8,340,672 | B2 | 12/2012 | Brown et al. | |
| 2007/0047482 | A1* | 3/2007 | Costa et al. ................... | 370/328 |
| 2009/0141685 | A1* | 6/2009 | Berglund ...................... | 370/331 |
| 2011/0128865 | A1* | 6/2011 | Doppler et al. .............. | 370/252 |

FOREIGN PATENT DOCUMENTS

| | | |
|---|---|---|
| EP | 2273828 | 1/2011 |
| WO | 2010142681 | 12/2010 |

OTHER PUBLICATIONS

Wi-Fi Peer-to-Peer (P2P) Technical Specification v1.1; Wi-Fi Alliance Technical Committee P2P Task Group; Wi-Fi Alliance; 2010; 159 pages.
IEEE Std 802.11-2007; Part 11: Wireless LAN Medium Access Control (MAC) and Physical Layer (PHY) Specifications; IEEE Standard for Information technology—Telecommunications and information exchange between systems—Local and metropolitan area networks—Specific requirements; IEEE Computer Society, New York, NY; Jun. 12, 2007; 1232 pages.

* cited by examiner

*Primary Examiner* — Afsar M Qureshi
(74) *Attorney, Agent, or Firm* — Winstead PC

(57) ABSTRACT

Power saving in wireless networks is disclosed. A wireless network entity that includes a module to enable a reduction in power consumption in that wireless network entity is also disclosed. The module is configured to determine that a selected wireless station of one or more wireless stations associated with the wireless network entity in a same wireless network will transmit system control information (including synchronization information and service identification information) that is normally transmitted by the wireless network entity.

32 Claims, 6 Drawing Sheets

POWER SAVING IN WIRELESS NETWORK ENTITIES

BACKGROUND OF THE DISCLOSURE

The number, prevalence and importance of wireless networks are increasing more and more every day. Wireless access points are common devices found in wireless networks. One function of a wireless access point is to transmit beacon frames in the coverage area of the wireless access point to provide necessary information to other network devices. It is conventional that the wireless access point is operating to continually transmit beacon frames on a periodic basis regardless of whether the wireless access point is in a fully on mode or, for example, a power saving state where the wireless access point is only partially functional; however it will be appreciated that a higher power consumption is associated with continually transmitting beacon frames on a periodic basis as compared to a scenario involving non-continual transmission of beacon frames.

Accordingly, it would be advantageous to improve power saving techniques in wireless access points.

SUMMARY

According to one example embodiment, there is provided a method that is carried out by a wireless access point. The method includes notifying a plurality of wireless stations in a basic service set of the wireless access point that a selected one of the plurality of wireless stations will become a delegate for transmitting beacons normally transmitted by the wireless access point. The method also includes notifying the selected one of the plurality of wireless stations that the selected one of the plurality of wireless stations is to begin transmitting the beacons normally transmitted by the wireless access point. The method also includes discontinuing, after the notifying of the plurality of wireless station and the notifying of the selected one of the plurality of wireless stations, normal beacon transmission.

According to another example embodiment, there is provided a method that is carried out by a wireless network entity. The method includes determining that a selected wireless station of one or more wireless stations in a same wireless network as the wireless network entity will transmit system control information that is normally transmitted by the wireless network entity, including synchronization information and system information necessary for wireless stations to initiate access to the wireless network. The method also includes notifying the one or more wireless stations in the wireless network that the wireless network entity will be absent from the wireless network for a defined period of time. The method also includes discontinuing, after the determining and the notifying, system control information transmission by the wireless network entity.

According to yet another example embodiment, there is provided a wireless network entity. The wireless network entity includes an antenna to receive and conduct wireless signals. The wireless network entity also includes a Radio Frequency (RF) module communicatively coupled to the antenna. The RF module is configured to enable communication of the wireless signals within a wireless network to which the wireless network entity belongs. A processor is communicatively coupled to the RF module. The wireless network entity also includes a module associated with the processor. The module is configured to: i) determine that a selected wireless station of one or more wireless stations associated with the wireless network entity in the wireless network will transmit system control information that is normally transmitted by the wireless network entity, including synchronization information and service identification information; ii) generate a notification to be communicated to the one or more wireless stations in the wireless network that the wireless network entity will be absent from the wireless network for a defined period of time; and iii) cause a discontinuation, subsequent to the notification, of system control information transmission by the wireless network entity.

According to yet another example embodiment, there is provided a wireless network. The wireless network includes a plurality of wireless stations that includes at least a first wireless station and a second wireless station. The first wireless station is configured to transmit system control information, including synchronization information and service identification information, to at least the second wireless station, during a defined period of time. A wireless network entity of the wireless network includes an antenna to receive and conduct wireless signals. The wireless network entity also includes a Radio Frequency (RF) module communicatively coupled to the antenna. The RF module is configured to enable communication of the wireless signals within the wireless network. A processor is communicatively coupled to the RF module. The wireless network entity also includes a module associated with the processor. The module is configured to: i) determine that the first wireless station in the wireless network will transmit the system control information that is normally transmitted by the wireless network entity; ii) generate a notification to be communicated to at least the first and second wireless stations that the wireless network entity will be absent from the wireless network for the defined period of time; and iii) cause a discontinuation, subsequent to the notification, of system control information transmission by the wireless network entity.

A wireless local area network in accordance with a number of example embodiments includes at least one network station that has associated with a wireless access point (and optionally some potential network stations in a basic service set area plan to associate with the wireless access point).

In accordance with some example embodiments, a wireless access point may, during an absence period, carry out other tasks instead of entering a power saving mode. These tasks may include maintenance, fault recovery, re-configuration, software upgrade, etc.

Thus, improved networks, wireless access points and network stations have been provided.

BRIEF DESCRIPTION OF THE DRAWINGS

Reference will now be made, by way of example, to the accompanying drawings.

Similar or the same reference numerals may have been used in different figures to denote similar example features illustrated in the drawings.

DETAILED DESCRIPTION OF EXAMPLE EMBODIMENTS

The term "beacon" as it is herein used is not necessarily limited to only the meaning of beacon as understood in the context of the IEEE 802.11 standard, but may also refer to any similar system control information produced in other types of wireless networks. For example, in a mobile network, the system control information may include synchronization information and system information, which are broadcasted by a wireless network entity such as, for example, a Node B in the radio access network of a Universal Mobile Telecommunications System (UMTS) mobile network. The system control information contains information necessary for mobile stations to initiate access to the mobile network.

Figure 1:
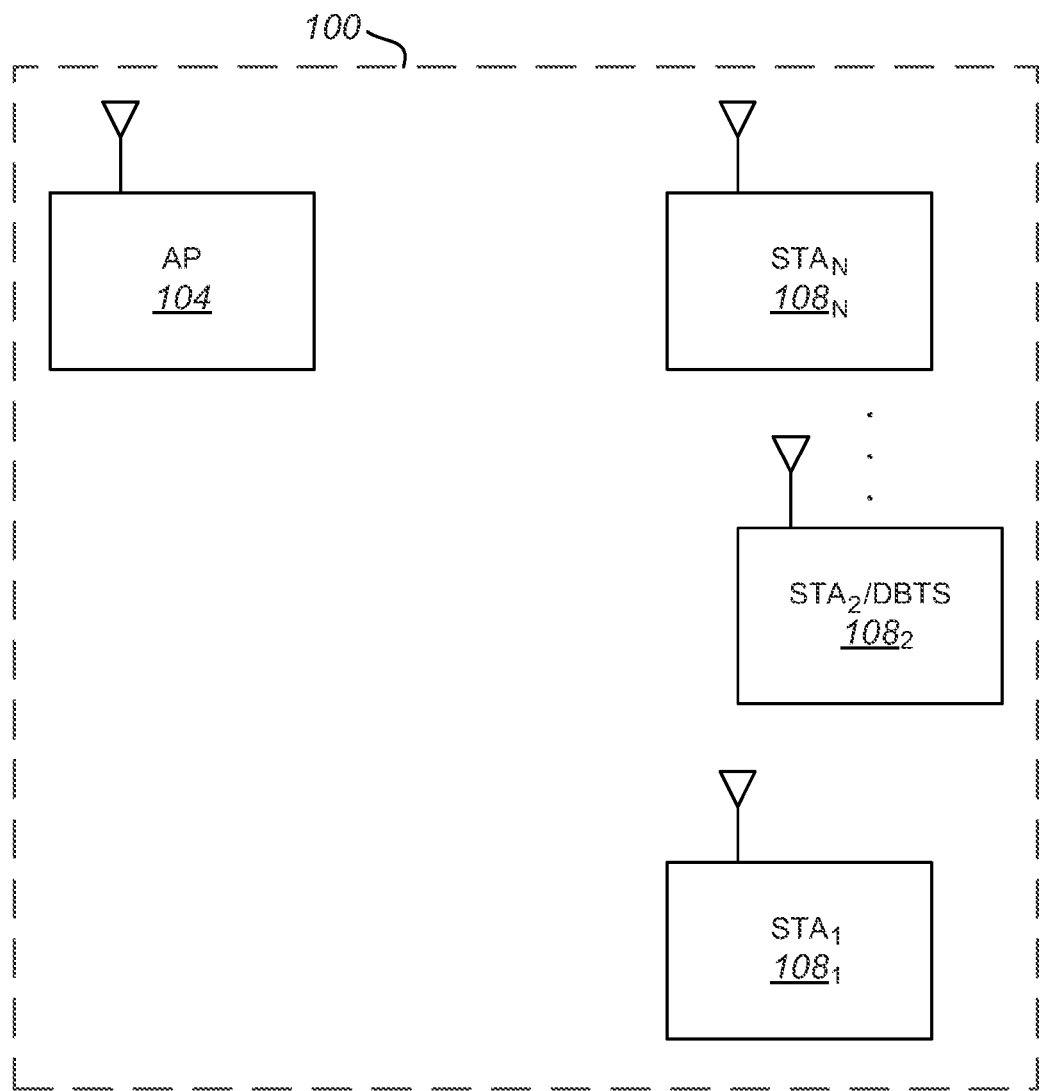
FIG. 1 is a block diagram of a wireless local area network in accordance with example embodiments.

An example network scenario where example embodiments of the invention may be used is a Wireless Local Area Network (WLAN) such as WLAN 100 diagrammatically illustrated in FIG. 1. The WLAN 100 may be based on IEEE 802.11 standard, which is frequently identified as a standard providing a basis for wireless network products using the Wi-Fi™ brand. Now while some example embodiments of the invention are described in the context of an IEEE 802.11 WLAN, it should be understood that other example embodiments of the invention are applicable to other types of WLANs incorporating other type of standards (such as, for example, HiperLAN).

The illustrated WLAN 100 includes a wireless access point (AP) 104 and network stations (STAs) $108_1$-$108_N$ (where N is some integer greater than one). Many variations from what is illustrated in FIG. 1 are contemplated. For example, although the AP 104 is shown as only a single device for convenience of illustration, it is contemplated that an AP could be formed by more than one physically separated devices (for example, there could be two devices with one of the devices being an extender device). As another example, although a plurality STAs are shown in FIG. 1, there may in some instances be as few as one STA. Also, it should be understood that the AP 104 is a specific example of what is more generally herein referred to as a wireless network entity.

As understood by those skilled in the art, the AP 104 can transmit signals wirelessly to be received by any one or more of the STAs $108_1$-$108_N$. Similarly any one or more of the STAs $108_1$-$108_N$ can transmit signals wirelessly to be received by the AP 104. In accordance with some example embodiments, the AP 104 and the STAs $108_1$-$108_N$ transmit and receive signals within a specific frequency band; however that frequency band is divided into a number of channels such as, for example, eleven channels (a fewer or greater number of channels is of course also contemplated).

Continuing on, in an infrastructure mode of the WLAN 100 implementing the IEEE 802.11 standard, the AP 104 and one or more of the STAs $108_1$-$108_N$ associated with the AP 104 form a basic service set (BSS). The AP 104 acts as a master to control the one or more of the STAs $108_1$-$108_N$ in the BSS and provides access to other networks. The AP 104 transmits beacon frames in its coverage area to provide necessary information for the operation of the BSS. The information includes timestamp for synchronization, beacon interval, service set identifier (SSID), etc. The time when a beacon is sent is called target beacon transmission time (TBTT). An STA should first synchronize with the AP based on the timestamp included in the beacon and associate with the AP 104 before it is able to do communication through the AP 104.

Regarding normal beacon transmission from the AP 104, this is generally a periodic beacon transmission (i.e. the beacon transmission recurs at regular intervals); however those skilled in the art will appreciate that this need not necessarily always be the case. As an example, a beacon transmission normally expected at one instance in time may be delayed for some reason such as, for example, the AP 104 being unable to transmit the beacon at the expected time because of a conflict in resources resolved in favor of some other operation being carried out within the AP 104. Thus, a beacon transmission normally expected at one instance in time may be delayed for actual transmission to occur at a later instance in time.

According to some example embodiments of the invention, the AP 104 assigns one of the STAs $108_1$-$108_N$ ($STA_2$ $108_2$ in FIG. 1) as a delegate to transmit beacons during its absence. This assigned delegate is herein referred to as a Delegated Beacon Transmitting Station (DBTS). The DBTS therefore transmits beacons in the BSS on behalf of the AP 104 during its absence.

When the AP 104 determines that it needs to be absent from the network communications (for example, for the purpose of power saving), the AP 104 transmits a leaving notice to the STAs $108_1$-$108_N$ in the WLAN 100, notifying its plan of absence timing. The leaving notice may contain information about the start time and the duration of the absence. For example, the leaving notice may indicate that the absence of the AP 104 will start from next TBTT and last for N beacon intervals. Assuming current TBTT is $TBTT_n$, the STAs $108_1$-$108_N$ that receives this leaving notice can understand that the AP 104 will be absent from $TBTT_{(n+1)}$ and back on $TBTT_{(n+1+N)}$ and no data transmission and reception can be expected during this period. The leaving notice can be included in a beacon, a probe response, an action frame, etc. For example, an information element named 'leaving notice' can be included in a beacon transmitted by the AP 104 prior to the start time of the absence. The information element of the leaving notice includes start time, absence duration and optionally remained duration. In the leaving notice, the remained duration is the same as the absence duration. The start time, absence duration and remained duration may be described using relative or absolute value such as, for example, in numbers of beacon interval or in numbers of time unit.

Also, before continuing on in the description of example embodiments, it should lastly be noted that, in regards to the network of FIG. 1 that has been shown and described herein, certain specific details not sufficiently relevant to an understanding of example embodiments may have been omitted so as not to obscure inventive features disclosed herein.

Figure 2:
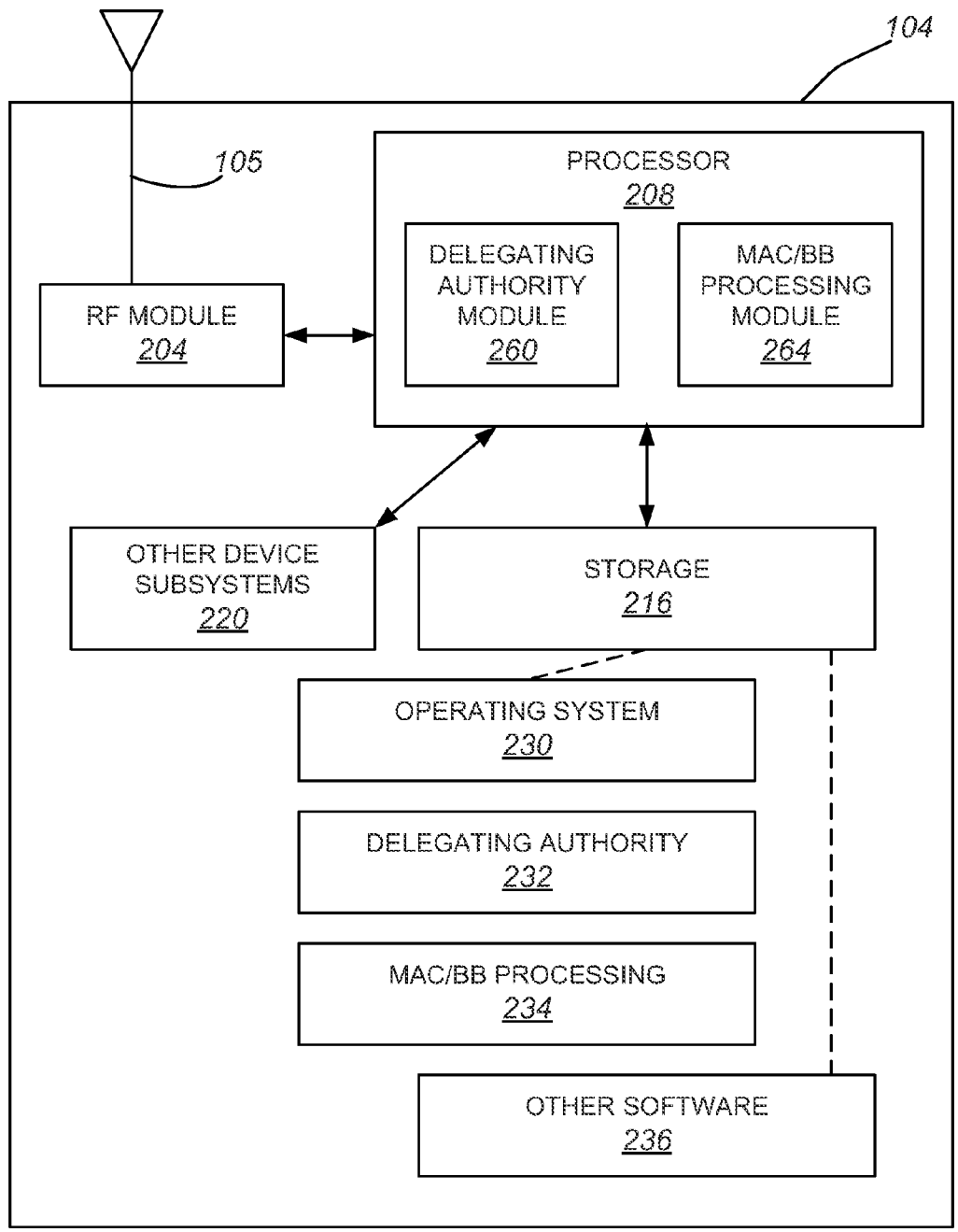
FIG. 2 is a block diagram of an example embodiment of the wireless access point shown in FIG. 1.

Now continuing on, FIG. 2 is a block diagram of an example embodiment of the AP 104 shown in FIG. 1. The illustrated AP 104 includes an antenna 105 for receiving and conducting wireless signals. The illustrated AP 104 also includes an Radio Frequency (RF) module 204, a subsystem of the AP 104, to enable wireless communication within a WLAN (and, in some examples, some other type of wireless network as well). The RF module 204 may include a receiver, a transmitter and other components known to those skilled in the art. The AP 104 of FIG. 2 also includes a processor 208 that controls the overall operation of the AP 104. The processor 208 interacts with the RF module 204 and also interacts with further subsystems of the AP 104 such as storage 216 and other device subsystems 220. The processor 208 may include a Media Access Control (MAC)/baseband (BB) processing module 264 and delegating authority module 260. The delegating authority module 260 may interact with the MAC/baseband processing module 264 to implement some example embodiments. Alternatively, the delegating authority module 260 may be included in the MAC/baseband processing module 264 to implement some example embodiments. The other device subsystems 220 includes those subsystems understood by those skilled in the art as needed to ensure proper operation and functioning of the AP 104, as well as any suitable number of additional optional subsystems. An example of the former type of subsystem would be a power supply subsystem for powering the AP 104, whereas an example of the latter type of subsystem would be a wireline communications subsystem in order to support some form of communications that is wireline-based such as, for example, Ethernet-based communications.

In the illustrated example embodiment, operating system software 230, delegating authority software 232, MAC/BB processing software 234, and other software 236 are stored in storage 216. In some examples, the storage 216 is a nonvolatile storage such as, for example, flash memory. In accordance with such examples, those skilled in the art will appreciate that software and applications (or parts thereof) may be temporarily loaded into a volatile storage such as some form of random access memory (not explicitly shown). Furthermore, it is also contemplated that communication signals received by the AP 104 may be stored in such random access memory.

The processor 208, in addition to its operating system functions, can enable execution of software (for example, the delegating authority software 232 and the MAC/BB processing software 234) on the AP 104. In some examples, the processor 208 is configured to implement a number of modules for interacting with the various device subsystems or other modules described or mentioned above. In some examples, some or part of the functionality of a number of these modules can be implemented through firmware or hardware components instead of, or in combination with, computer software instructions executed by the processor 208 (or other processors).

In some example embodiments, the AP 104 includes another processor (i.e. in addition to the illustrated processor 208). This additional processor is known as an application processor. In such example embodiments, the application processor is able to communicate with the processor 208 to implement some example embodiments related to higher layer (i.e. layers above MAC layer) functions. Examples of higher layer functions include authentication, network management and a variety of applications. In some example embodiments, the processor 208 may have its own Random Access Memory (RAM) and firmware (i.e. firmware to implement a MAC/BB processing module and a delegating authority module, which may be a sub-module of the MAC/BB processing module or a separate module). The application processor may also have its own Random Access Memory (RAM) and firmware. In other example embodiments, the processor 208 and the application processor may use the same Random Access Memory (RAM). Also, the application processor may be implemented on an entirely different integrated circuit chip than the processor 208. Alternatively, the application processor may be disposed on a same integrated circuit chip.

Returning again to the illustrated example embodiment, under instructions from the delegating authority software 232 resident on the AP 104, the processor 208 could be configured to implement delegating authority module 260. The delegating authority module 260 facilitates implementation of all methods herein described in connection with selection and handling of DBTS assignment (and associated methods), including methods that will be later herein described in connection with FIGS. 4-6.

As a second module example, under instructions from the MAC/BB processing software 234 resident on the AP 104, the processor 208 could be configured to implement MAC/BB processing module 264. As previously explained, the MAC/BB processing module 264 is for managing some or all functions that are related to MAC and/or physical layer. Furthermore, the delegating authority module 260 may be, as previously mentioned, a sub-module of the MAC/BB processing module or a separate module.

Figure 3:
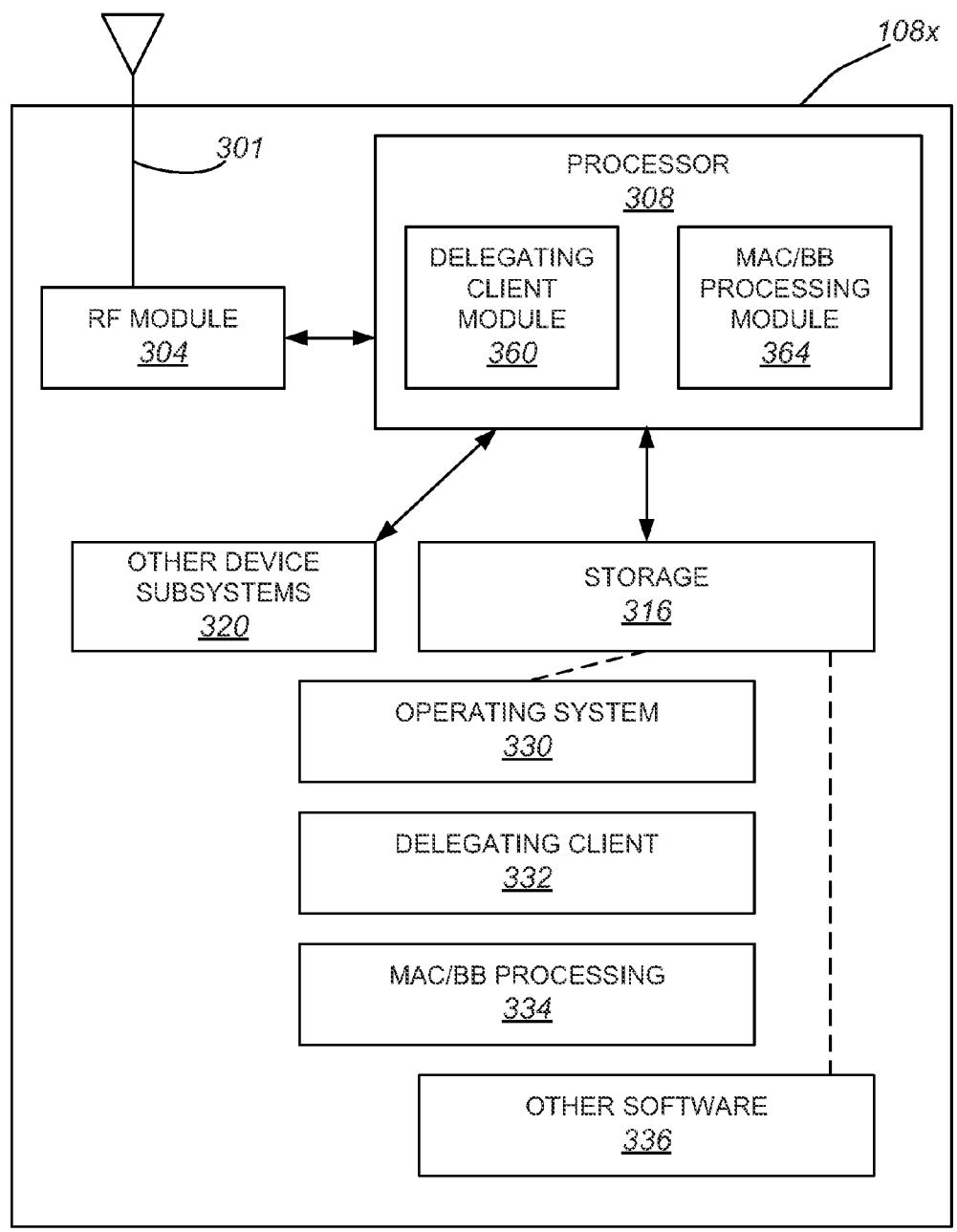
FIG. 3 is a block diagram of an example embodiment of a network station capable of being selected as the delegated beacon transmitting station shown in FIG. 1.

Continuing on, FIG. 3 is a block diagram of an example embodiment of an STA $108_x$ (i.e. any one of the STAs $108_1$-$108_N$ shown in FIG. 1). The illustrated STA $108_x$ includes an antenna 301 for receiving and conducting wireless signals. The illustrated STA $108_x$ also includes an RF module 304, a subsystem of the STA $108_x$, to enable wireless communication within a WLAN (and, in some examples, some other type of wireless network as well). The RF module 304 may include a receiver, a transmitter and other components known to those skilled in the art. The STA $108_x$ of FIG. 3 also includes a processor 308 that controls the overall operation of the STA $108_x$. The processor 308 interacts with the RF module 304 and also interacts with further subsystems of the STA $108_x$ such as storage 316 and other device subsystems 320. The processor 308 may include MAC/baseband processing module 364 and delegating client module 360. The delegating client module 360 may interact with the MAC/baseband processing module 364 to implement example embodiments. Alternatively, the delegating client module 360 may be included in the MAC/baseband processing module 364 to implement example embodiments. The other device subsystems 320 includes those subsystems understood by those skilled in the art as needed to ensure proper operation and functioning of the STA $108_x$, as well as any suitable number of additional optional subsystems. An example of the former type of subsystem would be a power supply subsystem for powering the STA $108_x$, whereas an example of the latter type of subsystem would be a wireline communications subsystem in order to support some form of communications that is wireline-based such as, for example, Ethernet-based communications.

In the example embodiment, operating system software 330, delegating client software 332, MAC/BB processing software 334, and other software 336 are stored in storage 316. In some examples, the storage 316 is a nonvolatile storage such as, for example, flash memory. In accordance with such examples, those skilled in the art will appreciate that software and applications (or parts thereof) may be temporarily loaded into a volatile storage such as some form of random access memory (not explicitly shown). Furthermore, it is also contemplated that communication signals received by the STA $108_x$ may be stored in such random access memory.

The processor 308, in addition to its operating system functions, can enable execution of software (for example, the delegating client software 332 and the MAC/BB processing software 334) on the STA $108_x$. In some examples, the processor 308 is configured to implement a number of modules for interacting with the various device subsystems or other modules described or mentioned above. In some examples, some or part of the functionality of a number of these modules can be implemented through firmware or hardware components instead of, or in combination with, computer software instructions executed by the processor 308 (or other processors).

In some example embodiments, the STA $108_x$ includes another processor (i.e. in addition to the illustrated processor 308). This additional processor is known as an application processor. In such example embodiments, the application processor is able to communicate with the processor 308 to implement some example embodiments related to higher layer (i.e. layers above MAC layer) functions. Examples of higher layer functions include authentication, network management and a variety of applications. In some example embodiments, the processor 308 may have its own Random Access Memory (RAM) and firmware (i.e. firmware to implement a MAC/BB processing module and a delegating client module, which may be a sub-module of the MAC/BB processing module or a separate module). The application processor may also have its own Random Access Memory (RAM) and firmware. In other example embodiments, the processor 308 and the application processor may use the same Random Access Memory (RAM). Also, the application processor may be implemented on an entirely different integrated circuit chip than the processor 308. Alternatively, the application processor may be disposed on a same integrated circuit chip.

Returning again to the illustrated example embodiment, under instructions from the delegating client software 332 resident on the STA $108_x$, the processor 308 could be configured to implement delegating client module 360. The delegating client module 360 enables the STA $108_x$ to take necessary action in response to receipt of leave notices from the AP 104, as well as any necessary action in connection with acceptance of DBTS assignment and change in operation associated with assumption of a DBTS role.

As a second module example, under instructions from the MAC/BB processing software 334 resident on the STA $108_x$, the processor 308 could be configured to implement MAC/BB processing module 364. As previously explained, the MAC/BB processing module 364 is for managing some or all functions that are related to MAC and/or physical layer. Furthermore, the delegating client module 360 may be, as previously mentioned, a sub-module of the MAC/BB processing module or a separate module.

Also, before continuing on in the description of example embodiments, it should lastly be noted that, in regards to the network devices of FIGS. 2 and 3 that have been shown and described herein, certain implementation specific details not sufficiently relevant to an understanding of example embodiments may have been omitted so as not to obscure inventive features disclosed herein.

Now referring again to FIG. 1, The AP 104 can select and designate one of the STAs $108_1$-$108_N$ as a DBTS during its absence. The designation may be explicitly announced to all the STAs $108_1$-$108_N$ in the BSS or implicitly notified to only the STA selected as the DBTS. In the case of explicit designation, the AP 104 may send, to all the STAs $108_1$-$108_N$ in the WLAN 100 a designation message including at least the MAC address of the $STA_2$ $108_2$ selected as the DBTS. The designation can be included in the leaving notice or sent as a separate message. The designation message can also be included in, for example, a beacon, a probe response, an action frame, etc. In the case of implicit designation, the AP 104 may send the designation message only to the $STA_2$ $108_2$ selected as the DBTS through, for example, in a specific action frame.

Figure 4:
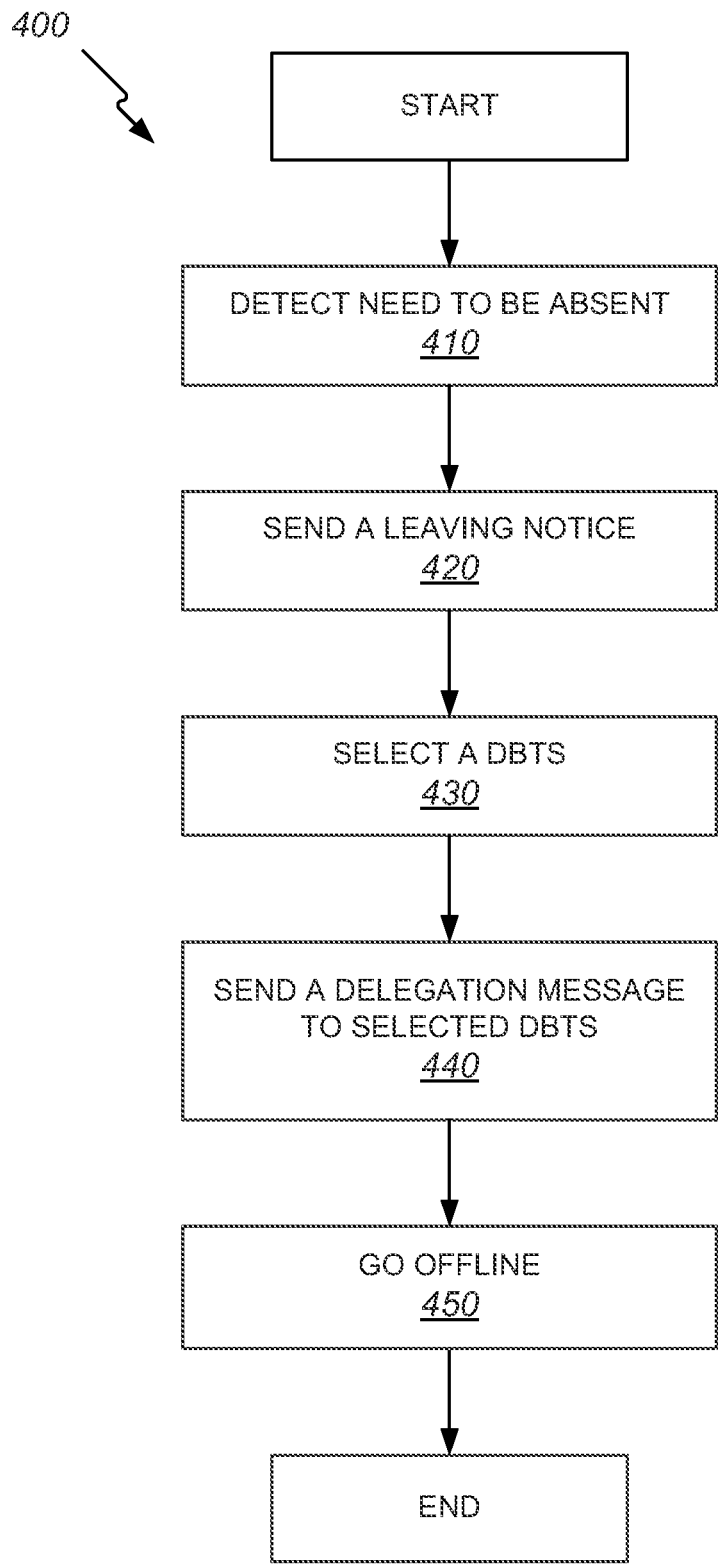
FIG. 4 is a flow chart illustrating a method for implicit designation in accordance with at least one example embodiment.

FIG. 4 is a flow chart illustrating a method 400 in accordance with at least one example embodiment. As a first action in the illustrated method 400, the AP 104 detects (410) a need to be absent. The need to be absent can be for any of the reasons that are described in this patent specification.

Next, the AP 104 sends (420) a leaving notice to the STAs $108_1$-$108_N$ in the WLAN 100. The details of this leaving notice have already been herein described.

Next, the AP 104 selects (430) a DBTS (i.e. one of the STAs $108_1$-$108_N$). Also, it should be noted that the action 430 need not necessarily occur after the action 420. The order could be either way.

The second last action in the illustrated method 400 is the AP 104 sending (440) a delegation message to the selected DBTS. As mentioned before, the designation could be implicit or explicit. In case of implicit designation, the designation message may be addressed to all the STAs $108_1$-$108_N$ in the BSS using a broadcast frame. In case of implicit designation, the designation message may be sent to the STA selected as the DBTS using a unicast frame. The details of this delegation message have already been herein described. Also, it should be noted that the action 440, like the action 430, need not necessarily occur after the action 420. The order could be either way.

Finally at action 450, the AP 104 goes offline from the BSS.

Figure 5:
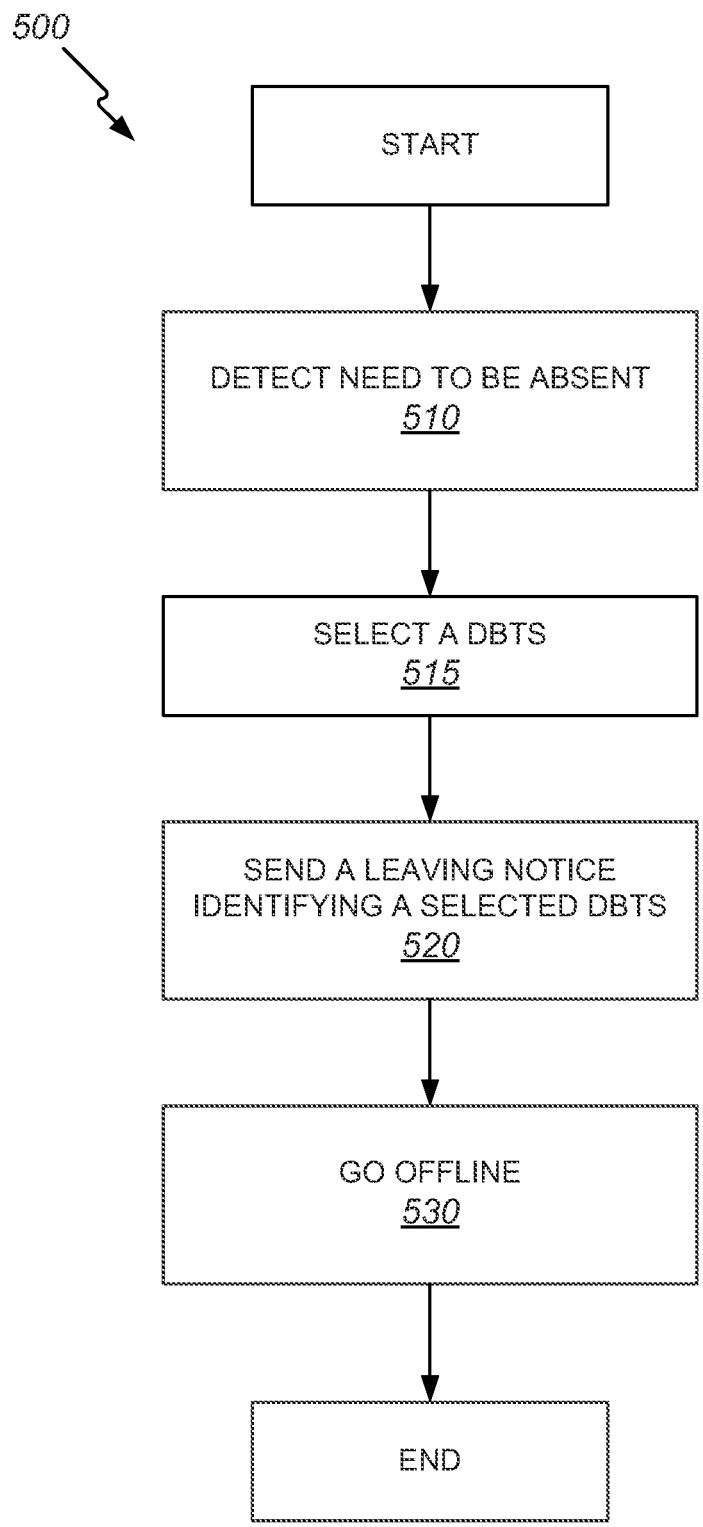
FIG. 5 is another flow chart illustrating a method for explicit designation in accordance with at least one example embodiment.

FIG. 5 is a flow chart illustrating a method 500 for explicit designation in accordance with at least one example embodiment. As a first action in the illustrated method 500, the AP 104 detects (510) a need to be absent. The need to be absent can be for any of the reasons that are described in this patent specification.

Next, the AP 104 selects (515) a DBTS (i.e. one of the STAs $108_1$-$108_N$).

Next, the AP 104 sends (520), to the STAs $108_1$-$108_N$ in the WLAN 100, a leaving notice identifying one of the STAs $108_1$-$108_N$ as a selected DBTS. The details of this leaving notice in accordance with explicit designation have already been herein described.

Finally at action 530, the AP 104 goes offline from the BSS.

Table 1 below details the structure of one possible leaving notice of a type for either the method 400 or the method 500.

TABLE 1

Example Leave Notice

| Part 1 | Part 2 | Part 3 | Part 4 | Part 5 | Part 6 (explicit designation) |
|---|---|---|---|---|---|
| Element ID | Length | Start Time | Duration | Duration Remaining | DBTS Info |

In some examples, the leaving notice follows a common general format as defined in IEEE 802.11, which consists of a 1 octet Element ID field, a 1 octet length field and a variable-length element-specific information field. As shown in Table 1, the information field in a leaving notice may include Start Time, Duration, Duration Remaining, and DBTS Info for explicit designation.

Part 1—Element ID: each information element of beacon frame (in IEEE 802.11, there may be several information elements in one beacon frame) is assigned a unique Element ID. The leaving notice may use one of the reserved Element IDs defined in IEEE 802.11 standard.

Part 2—Length: Length field describes the length of the information field.

Part 3—Start Time: if Start Time is set to 1, it means that the AP 104 will be absent from next TBTT (i.e. $TBTT_{(n+1)}$)

Part 4—Duration: if Duration is set to N, it means that the AP 104 will be absent for N beacon intervals Part 5—Duration Remaining: it indicates the remained Duration before the AP comes back Part 6—DBTS Info (explicit designation): DBTS Info provides indication of which of the STAs $108_1$-$108_N$ is going to be the DBTS.

Prior to the selection and designation, the AP 104 may collect a candidate list of those STAs of the STAs $108_1$-$108_N$ that are capable of acting as a DBTS (i.e. those STAs are capable of transmitting beacons in the WLAN 100 on behalf of the AP 104). An STA may provide the indication of its capability as a potential DBTS to the AP 104 during association procedure, or it may submit its capability as a response to a request from the AP 104.

In some example embodiments, the AP 104 selects one of the STAs $108_1$-$108_N$ as a DBTS from the candidate list: i) on a random basis; ii) according to some predetermined criteria; or iii) according to default configurations. In case iii), one of the STAs $108_1$-$108_N$ is configured as the default DBTS, and the AP 104 is configured to use the default DBTS during its absence. When this STA has received a leaving notice from the AP 104, it will act as DBTS to transmit beacons during the defined absence period of the AP 104. In this case, it may not be necessary for the AP 104 to send a designation message to the STA that will act as DBTS.

According to one example embodiment, the AP 104 selects, from the candidate list, an STA that is nearby as the DBTS. When done this way, an impact may be that the coverage of the beacon signals provided by the nearby STA could be similar to that provided by the AP 104. This may be beneficial in terms of: i) substantial minimization of unexpected interference to other WLANs; and ii) increased probability of providing the same coverage as managed by the AP 104.

The AP 104 may use a variety of mechanisms to determine whether an STA is nearby. In one example embodiment, the AP 104 may use a direct knowledge of the network topology to identify a nearby STA. Topology discovery mechanisms, such as report-based topology discovery or Logical Link Layer-based topology discovery, and others are well known to those skilled in the art and can be used individually or in combination to gain such knowledge. In another example embodiment, the AP 104 may assume that an STA is nearby if the quality of the link between the AP 104 and the STA is better than others. The quality of the links between the AP 104 and the STAs $108_1$-$108_N$ can be determined based on measurements on received signals at the AP 104 and/or measurements reported from the STAs $108_1$-$108_N$.

For instance, the AP 104 may, in accordance with what will be herein referred to as a first example embodiment for DBTS determination, send specific requests to either all or a defined group of the STAs $108_1$-$108_N$ in the BSS, and then each STA having received the request will send back a corresponding response message. The AP 104 could measure, for example, the received signal strength of each response message. The response message may include some parameters such as the transmit power used to transmit the message. The AP 104, therefore, is able to estimate (and thus determine) the link quality between the AP 104 and the corresponding STA considering the measurement results and the parameters included in the response message. Now this link quality indicator has a key role in this first example embodiment for DBTS determination, because once the link quality indicator is obtained it can then be used to identify the best candidate for delegation. For example, the AP 104 may choose the closest one of the STAs $108_1$-$108_N$ as the delegate.

In another example embodiment, the AP 104 may use "Transmit Power Control (TPC) request" and "TPC report" defined in IEEE 802.11 as the specific request and the corresponding response, respectively. The AP 104 sends a "TPC request" to each or a defined group of the STAs $108_1$-$108_N$ in the BSS. As a response, each of the STA $108_1$-$108_N$ having received "TPC request" replies with a "TPC report" including information about the transmit power used to transmit the "TPC Report" frame and the link margin at the time and for the rate at which the frame containing the "TPC Request" frame was received. In some examples, the STAs transmit the "TPC Report" frames at the same transmission data rate (such as, for example, the basic data rate). This can facilitate the comparison by the AP 104.

In accordance with what will be herein referred to as a second example embodiment for DBTS determination, the AP 104 uses a modified procedure of "measurement request" and "measurement report" as defined in IEEE 802.11 to collect information for link quality estimation. For example, the AP 104 may send a measurement request to the STAs $108_1$-$108_N$, with measurement start time and measurement duration defined. The measurement type may be set as "receive power indication (RPI) histogram request". The Channel number may be set to the channel number that is currently used by the AP 104. After conducting the measurement, the STAs $108_1$-$108_N$ may respond with a measurement report including RPI histogram report. The AP 104 can then carry out link quality estimation (and thus determine link quality) based on the collected RPI information.

Figure 6:
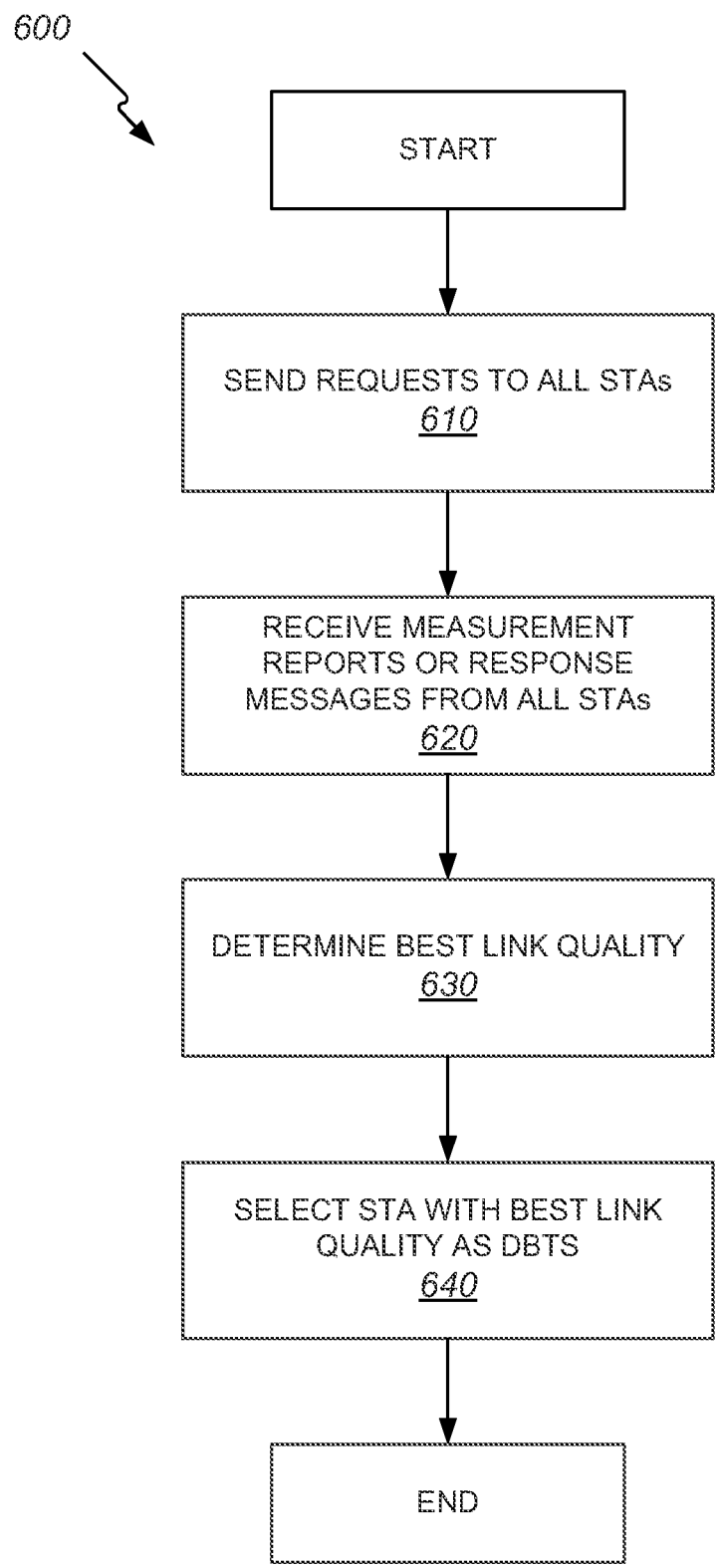
FIG. 6 is a flow chart illustrating a method for DBTS determination in accordance with example embodiments.

FIG. 6 is a flow chart illustrating a method 600 for DBTS determination. This flow chart helps provide, at least in some respects, a generalization of the previously described first and second example embodiments for DBTS determination.

As a first action in the illustrated method 600, the AP 104 sends (610) requests (such as, for example, measurement requests) to all of the STAs $108_1$-$108_N$ in the BSS. Alternatively, the AP 104 might send requests to some defined number of the STAs $108_1$-$108_N$ less than all of the STAs $108_1$-$108_N$ in the BSS.

Next, the AP 104 receives (620) measurement reports (or response messages) from all of the STAs $108_1$-$108_N$ in the BSS. Alternatively, in the case where the AP 104 only sent requests to a defined number of the STAs $108_1$-$108_N$ less than all of the STAs $108_1$-$108_N$ in the BSS, then in such a case the AP 104 would only receive measurement reports (or response messages) from those STAs.

Next, the AP 104 determines (630) the best link quality. As previously mentioned and described, there are different specific ways of determining the best link quality.

Finally, the AP 104 selects (640) the STA with the best link quality to become the DBTS.

The method of FIG. 6 is not the only contemplated method for DBTS determination. In conjunction with alternative example embodiments for DBTS determination, the AP 104 may use different frames or messages specially defined for the purpose of some example embodiments. Furthermore, the AP 104 may use a combination of a variety of information collected from several different procedures such as, for example, the TPC request/report procedure, the measurement request/report procedure and/or the specially defined procedure, to estimate link quality.

In accordance with some example embodiments, all of the information used for the link quality estimation may be collected within a certain time period (in order to achieve comparable estimation results).

In accordance with at least one example embodiment, the AP 104 selects a DBTS considering the power supply status of the STAs in the candidate list. The AP 104 may request information about the power supply status from the STAs in the candidate list.

In accordance with another example embodiment, the AP 104 may transmit a message calling for volunteers for a DBTS, and then select an STA from the volunteers as the DBTS.

Also, it is contemplated that the AP 104 may select a DBTS using a combination of the mechanisms described above.

During the absence period of the AP 104, the DBTS transmits beacons in the BSS on behalf of the AP 104 (it is expected that a beacon contains the same SSID as used by the AP 104). The beacons may be transmitted using the same channel as used by the AP 104. The beacon interval can be kept the same or may be longer than that of the AP 104 so as to save the power of the DBTS. This can facilitate the recovery of the normal communication in the BSS when the AP 104 comes back. The format of the beacon transmitted by the DBTS may be the same as that transmitted by the AP 104. In addition to the information element contained in a normal beacon frame, the beacon transmitted by the DBTS contains an information element similar to the leaving notice, including start time, absence duration and/or remained duration. The remained duration is updated in each TBTT so as to reflect the remained duration of the absence of the AP 104. The start time, absence duration and remained duration may be described using relative or absolute value such as, for example, in numbers of beacon interval or in numbers of time unit. In the case of explicit designation, the delegated AP may use its own MAC address as Basic Service Set Identifier (BSSID) when it transmits beacons on behalf of the AP 104. In the case of implicit designation, the delegated AP may use the MAC address of the AP 104 as BSSID.

The updated plan of absence timing of the AP 104 is therefore conveyed by the DBTS to the potential STAs in the BSS area that plan to associate with the AP 104. This way, the potential STAs can be aware of the time when the AP 104 will wake up, so that they can wait to start the association procedure with the AP 104 when the AP 104 wakes up. In addition, an STA may deliver a message to its user to inform of the approximate waiting time before it connects to the AP 104. This may save power of the potential STAs and reduce interference to other BSSes by reducing the attempts of scanning channels or transmitting probe requests. Furthermore, the potential STAs may obtain information necessary for it to initiate access to the WLAN 100 from the beacon conveyed by the DBTS before the AP 104 comes back.

During the absence period, the AP 104 may enter some form of power saving mode and needs not to even transmit beacons. For example, the AP 104 may disable its transmission part and turn to a listen-only mode. Furthermore, it is contemplated that the AP 104 may only periodically enable its reception part to listen to the beacons transmitted by the DBTS.

In another embodiment, the AP 104 disables both transmission and reception parts until the planned wake-up time. In order to achieve better synchronization with the TBTTs transmitted by the DBTS, the AP 104 may enable its reception part in advance such as, for example, a few TBTTs before the planned wake-up time. The time advance is configured to be enough for the AP 104 to synchronize using the timing contained in the beacons. This may facilitate the synchronization between the STAs $108_1$-$108_N$ and the AP 104 when the beacon transmission is switched back to the AP 104.

An alternative use scenario is contemplated in conjunction with some example embodiments. In particular, the AP 104 may, during the absence period, carry out other tasks instead of enter power saving mode. The tasks may include, for example, maintenance, fault recovery, re-configuration, software upgrade, etc.

During the absence period of the AP 104, any other STA that has already associated with the AP 104 may enter power saving mode. The associated STA may use information contained in the leaving notice to configure its own power saving mode, for example, so as to align the timing of the power saving mode of the STA according to the absence timing of the AP 104. In some examples, the associated STA may follow the procedures for power saving mode as defined in IEEE 802.11.

After the beacon transmission is switched back to the AP 104, the associated and potentially associated STAs synchronize using the timing information in the beacons sent by the AP 104.

In terms of determining a proper timing of absence, the AP 104 may use a variety of mechanisms to evaluate whether a suitable situation is presenting itself. For example, the AP 104 or a management unit related to the AP 104 may collect data that reflects the daily usage of the AP 104 by users (the STAs $108_1$-$108_N$). It is contemplated that the data can be derived from some events such as, for example, association/de-association requests and power mode indications from the STAs $108_1$-$108_N$.

The AP 104 or its management unit then analyzes the collected data and identifies different periods reflecting the usage of the AP 104. For example, if data collected during the past week shows that the BSS is busy from 8:00 am to 11:00 pm and from 2:00 pm to 6:00 pm every day, a first period is then identified as from 8:00 am to 11:00 pm and from 2:00 pm to 6:00 pm. In addition, the AP 104 or the management unit may identify a second period when the usage of the AP is less dense. For example, if data collected during the past week shows that the BSS is less busy but there are some association activities from 11:00 pm to 2:00 pm every day, the second period is then identified as from 11:00 pm to 2:00 pm. The AP 104 or its management unit may further identify a third period when no STA is using the AP 104. For example, if data collected during the past week shows that the BSS is idle from midnight to 5:00 am every day, the third period is then identified as from midnight to 5:00 am.

The above-mentioned second period may be a period for the AP 104 to employ one or more methods in accordance with example embodiments herein disclosed. Therefore, when the AP 104 needs to be absent for power saving or carrying other tasks mentioned above, it may schedule the absence within the second period and it may trigger one or more methods in accordance with example embodiments herein disclosed.

It is contemplated that, in different periods, the AP 104 may employ different methods in accordance with example embodiments. For example, during the previously mentioned first period, the AP 104 may trigger another method, such as, for example, one of various methods as defined in "Wi-Fi™ Peer-to-Peer (P2P) Technical Specification" version 1.1. Furthermore, during the third previously mention period, the AP 104 may, for example, simply switch off or use one or more of the methods described in accordance with example embodiments herein disclosed.

Certain adaptations and modifications of the described embodiments can be made. Therefore, the above discussed embodiments are considered to be illustrative and not restrictive. For example, although the various example embodiments have been described based on the scenario of a WLAN network, it should be understood that at least some example embodiments should not be limited to WLAN networks. Another scenario is, for example, a P2P network according to "Wi-Fi™ Peer-to-Peer (P2P) Technical Specification" version 1.1 by Wi-Fi™ Alliance. The group owner defined in that specification acts as the AP described in conjunction with example embodiments of the invention. At least some example embodiments of the invention can be used in other networks where at least one client device communicates with other clients or external terminals through a master device, and the master device uses beacons or broadcasting messages to deliver common information (such as, for example, synchronization information, system information, measurement control information) to all clients in its network. Fixed broadband wireless access systems (such as, for example, WiMax) and mobile networks (such as, for example, GSM/UMTS, CDMA/CDMA2000 and LTE) are examples of these type of networks (note: GSM is an acronym for Global System for Mobile Communications, CDMA is an acronym Code Division Multiple Access and LTE is an acronym for Long Term Evolution). In accordance with some example embodiments, base stations or relay nodes may be the master devices, and mobile stations and subscriber stations may be the clients.

What is claimed is:

1. A method carried out by a wireless access point, the method comprising:
   notifying a plurality of wireless stations in a basic service set of the wireless access point that a selected one of the plurality of wireless stations will become a delegate for transmitting beacons normally transmitted by the wireless access point;
   notifying the selected one of the plurality of wireless stations that the selected one of the plurality of wireless stations is to begin transmitting the beacons normally transmitted by the wireless access point; and
   discontinuing, after the notifying of the plurality of wireless station and the notifying of the selected one of the plurality of wireless stations, normal beacon transmission.

2. The method as claimed in claim 1 wherein the notifying of the plurality of wireless stations includes wirelessly transmitting a leave notice that includes information identifying the selected one of the plurality of network stations.

3. The method as claimed in claim 2 wherein the leave notice includes start time information and duration of absence information of the wireless access point to be absent from a network that includes the basic service set.

4. The method as claimed in claim 1 wherein the notifying of the plurality of wireless stations includes wirelessly transmitting a leave notice.

5. The method as claimed in claim 4 wherein the notifying of the selected one of the plurality of wireless stations includes wirelessly transmitting information identifying the selected one of the plurality of wireless stations as a delegated beacon transmitting station, the transmitting of the information carried out at a different time than the transmitting of the leave notice.

6. The method as claimed in claim 4 wherein the leave notice includes start time information and duration of absence information of the wireless access point to be absent from a network that includes the basic service set.

7. The method as claimed in claim 1 wherein the wireless access point is a IEEE802.11 standard compliant router.

8. The method as claimed in claim 1 wherein the beacons comprise beacon frames.

9. The method as claimed in claim 1 wherein the normal beacon transmission is a periodic beacon transmission.

10. The method as claimed in claim 1 further comprising carrying out maintenance, fault recovery, re-configuration or software upgrading within the wireless access point, the carrying out occurring after the discontinuing of the normal beacon transmission.

11. The method as claimed in claim 1 wherein a selection of the selected one of the plurality of wireless stations is based on transmit power information received by the wireless access point from each of the plurality of wireless stations.

12. The method as claimed in claim 1 wherein a selection of the selected one of the plurality of wireless stations is based on a plurality of measurement reports that include Receive Power Indication histogram reports, each of the plurality of measurement reports received from a respective one of the wireless stations.

13. A method carried out by a wireless network entity, the method comprising:
   determining that a selected wireless station of one or more wireless stations in a same wireless network as the wireless network entity will transmit system control information that is normally transmitted by the wireless network entity, including synchronization information and system information necessary for wireless stations to initiate access to the wireless network;
   notifying the one or more wireless stations in the wireless network that the wireless network entity will be absent from the wireless network for a defined period of time; and
   discontinuing, after the determining and the notifying, system control information transmission by the wireless network entity.

14. The method as claimed in claim 13 wherein the notifying includes wirelessly transmitting a leaving notice.

15. The method as claimed in claim 14 wherein the leaving notice includes start time information and duration of absence information of the wireless network entity to be absent from the wireless network.

16. The method as claimed in claim 15 wherein the leaving notice further includes information indicating duration remaining for absence of the wireless network entity.

17. The method as claimed in claim 14 wherein the leaving notice includes information identifying the selected wireless station.

18. The method as claimed in claim 13 wherein the determining includes notifying the selected wireless station that the selected wireless station is to begin transmitting the system control information normally transmitted by the wireless network entity.

19. The method as claimed in claim 18 wherein the determining further includes selecting the selected wireless station that is to begin transmitting the system control information normally transmitted by the wireless network entity.

20. The method as claimed in claim 18 wherein the selecting the selected wireless station includes selecting the selected wireless station: i) on a random basis; ii) according to some predetermined criteria, such as power level; or iii) according to default configurations.

21. The method as claimed in claim 13 wherein the wireless network entity is a wireless access point in a wireless LAN network.

22. The method as claimed in claim 21 wherein the wireless access point is an IEEE 802.11 standard complaint router.

23. The method as claimed in claim 13 wherein the wireless network entity is a base station in a mobile network.

24. The method as claimed in claim 13 wherein the one or more wireless stations are stations in a wireless LAN network.

25. The method as claimed in claim 24 wherein the stations in the wireless LAN network are IEEE 802.11 standard complaint stations.

26. The method as claimed in claim 13 wherein the one or more wireless stations are mobile stations in a mobile network.

27. A wireless network entity comprising:
an antenna to receive and conduct wireless signals;
a Radio Frequency (RF) module communicatively coupled to the antenna, the RF module configured to enable communication of the wireless signals within a wireless network to which the wireless network entity belongs;
a processor communicatively coupled to the RF module; and
a module associated with the processor, the module configured to:
  i) determine that a selected wireless station of one or more wireless stations associated with the wireless network entity in the wireless network will transmit system control information that is normally transmitted by the wireless network entity, including synchronization information and service identification information;
  ii) generate a notification to be communicated to the one or more wireless stations in the wireless network that the wireless network entity will be absent from the wireless network for a defined period of time; and
  iii) cause a discontinuation, subsequent to the notification, of system control information transmission by the wireless network entity.

28. The wireless network entity as claimed in claim 27 wherein the RF module is further configured to wirelessly transmit the notification.

29. The wireless network entity as claimed in claim 27 wherein the notification includes start time information and duration of absence information of the wireless network entity to be absent from the wireless network.

30. The wireless network entity as claimed in claim 27 wherein the notification includes information identifying the selected wireless station.

31. The wireless network entity as claimed in claim 27 wherein the module is further configured to select the selected wireless station that is to begin transmitting the system control information normally transmitted by the wireless network entity.

32. A wireless network comprising:
a plurality of wireless stations that includes at least a first wireless station and a second wireless station, the first wireless station configured to transmit system control information, including synchronization information and service identification information, to at least the second wireless station, during a defined period of time;
a wireless network entity including:
  an antenna to receive and conduct wireless signals;
  a Radio Frequency (RF) module communicatively coupled to the antenna, the RF module configured to enable communication of the wireless signals within the wireless network;
  a processor communicatively coupled to the RF module; and
  a module associated with the processor, the module configured to:
    i) determine that the first wireless station in the wireless network will transmit the system control information that is normally transmitted by the wireless network entity;
    ii) generate a notification to be communicated to at least the first and second wireless stations that the wireless network entity will be absent from the wireless network for the defined period of time; and
    iii) cause a discontinuation, subsequent to the notification, of system control information transmission by the wireless network entity.

* * * * *